United States Patent
Fujisaki et al.

(10) Patent No.: US 9,371,100 B2
(45) Date of Patent: Jun. 21, 2016

(54) VEHICLE BODY ASSEMBLING METHOD AND VEHICLE BODY ASSEMBLING DEVICE

(71) Applicant: HONDA MOTOR CO., LTD., Tokyo (JP)

(72) Inventors: Akio Fujisaki, Tochigi (JP); Hideto Kojima, Tochigi (JP); Yoshio Ishikawa, Tochigi (JP); Yoshitaka Matsukami, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/403,328

(22) PCT Filed: Feb. 21, 2013

(86) PCT No.: PCT/JP2013/054321
§ 371 (c)(1),
(2) Date: Nov. 24, 2014

(87) PCT Pub. No.: WO2013/183321
PCT Pub. Date: Dec. 12, 2013

(65) Prior Publication Data
US 2015/0102089 A1  Apr. 16, 2015

(30) Foreign Application Priority Data

Jun. 4, 2012  (JP) ................. 2012-127349

(51) Int. Cl.
*B23K 37/04*  (2006.01)
*B62D 65/02*  (2006.01)
*B23K 37/047*  (2006.01)
*B23K 31/02*  (2006.01)

(52) U.S. Cl.
CPC .............. *B62D 65/026* (2013.01); *B23K 31/02* (2013.01); *B23K 37/047* (2013.01); *B23K 37/0426* (2013.01); *B23K 37/0443* (2013.01); *B23K 2201/006* (2013.01); *B23K 2201/185* (2013.01); *B23K 2203/10* (2013.01); *B23K 2203/20* (2013.01)

(58) Field of Classification Search
CPC ...... B62D 65/02; B62D 65/00; B23K 37/047; B23K 37/0435; B23P 2700/50; B25H 1/0007
See application file for complete search history.

(56) References Cited

U.S. PATENT DOCUMENTS

| 4,538,044 A | * 8/1985 | Kadowaki et al. ............... 219/80 |
| 4,667,866 A | 5/1987 | Tobita et al. |

FOREIGN PATENT DOCUMENTS

| JP | 8-11553 | 2/1996 |
| JP | 2001-334973 | 12/2001 |

OTHER PUBLICATIONS

International Search Report, Date of mailing May 14, 2013.
European Search Report dated Apr. 19, 2016, 5 pages.

* cited by examiner

*Primary Examiner* — Erin Saad
(74) *Attorney, Agent, or Firm* — Rankin, Hill & Clark LLP

(57) ABSTRACT

Provided are a vehicle body assembling method and a vehicle body assembling device that are space-saving and economical. The vehicle body assembling method includes: a first holding step (S2) for holding a floor complete 1 by a first jig 9; a second holding step (S3) for holding a roof arch by a second jig; a jig connecting step (S4) for connecting the first jig and the second jig; a third holding step (S5) for holding side inner completes by the first jig and the second jig; and welding steps (S6 to S9) for forming an inner frame by welding.

2 Claims, 4 Drawing Sheets

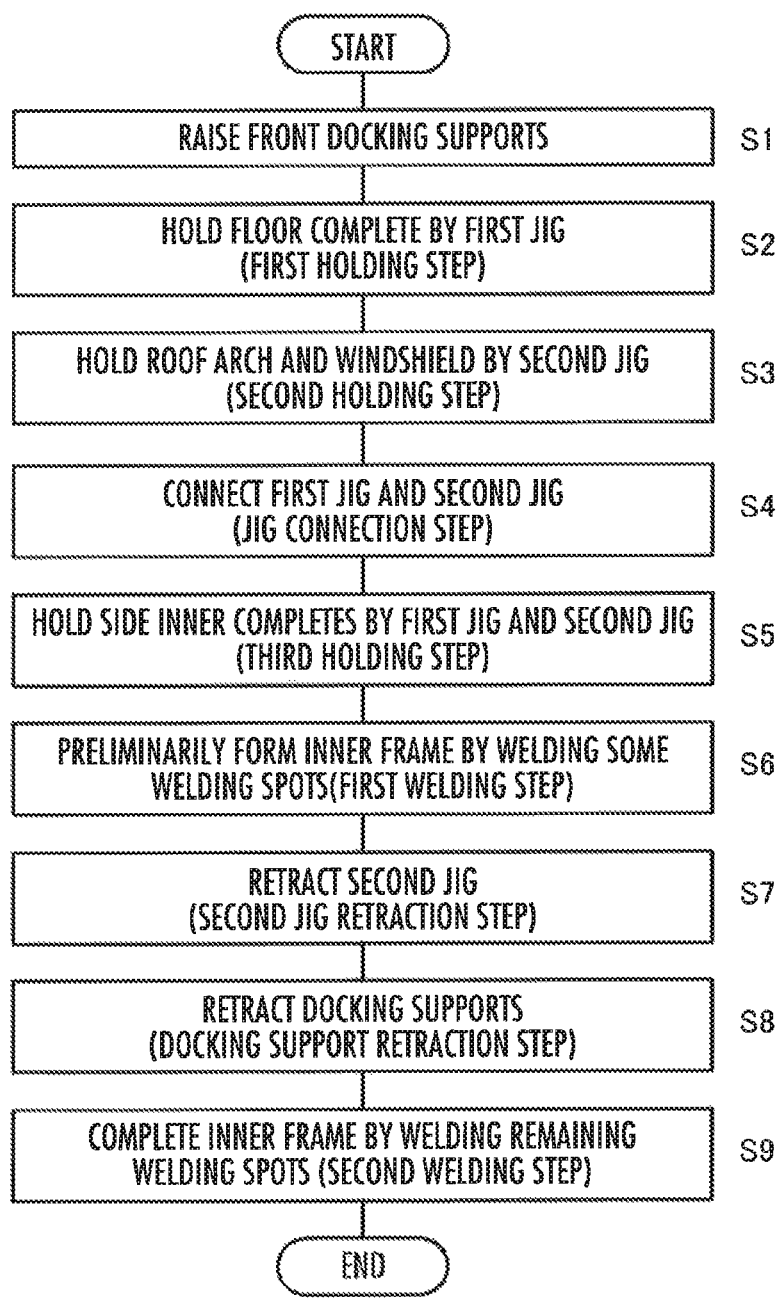

VEHICLE BODY ASSEMBLING METHOD AND VEHICLE BODY ASSEMBLING DEVICE

TECHNICAL FIELD

The present invention relates to a vehicle body assembling method and a vehicle body assembling device that form an inner frame of a vehicle body by using a floor assembly, side inner assemblies, and a roof arch.

BACKGROUND ART

Hitherto, as a vehicle body assembling method for assembling a vehicle body by using a floor member, side members, and a roof member, there has been known a method in which jigs holding each of the members are connected to preliminarily assemble the members, and the preliminarily assembled members are welded (e.g. Patent Document 1).

According to the method, in a state wherein a floor member, side members, and a roof member are held by a floor jig, a side jig, and a roof jig, respectively, the floor jig, the side jig, and the roof jig are connected to preliminarily assemble the floor member, the side members, and the roof members. Then, while retaining the preliminarily assembled state, the jigs are carried as one piece to a plurality of stations at which the floor member, the side members, and the roof member are welded for preliminary assembling.

After completing the preliminary assembling, the jigs are disconnected and separated to be detached. Then, additional welding is carried out to complete a main body.

CITATION LIST

Patent Literature

Patent Document 1: Japanese Patent Application Laid-open No. 2001-334973

SUMMARY OF INVENTION

Technical Problem

However, the conventional vehicle body assembling method described above requires carrying equipment for carrying the jigs in one piece and a number of welding machines for tack welding and additional welding at stations of a destination to which they are carried. In other words, to implement the vehicle body assembling method, various types of equipment have to be additionally provided. Hence, the vehicle body assembling method requires to secure cost and installation places for the additionally provided equipment.

In view of the problems with the prior art described above, an object of the present invention is to provide space-saving, economical vehicle body assembling method and device.

Solution to Problem

A vehicle body assembling method in accordance with the present invention is a vehicle body assembling method for forming an inner frame of a vehicle body by using a floor assembly, side inner assemblies, and a roof arch, comprising: a first holding step for holding the floor assembly by a first jig in a state in which the floor assembly is positioned at a predetermined holding position; a second holding step for holding the roof arch by a second jig in a state in which the roof arch is positioned at a predetermined holding position; a jig connecting step for connecting the first jig and the second jig so as to mutually position the floor assembly and the roof arch after the first holding step and the second holding step; a third holding step for holding the side inner assemblies by the first jig and the second jig in a state, in which the side inner assemblies are positioned with respect to the floor assembly and the roof arch, after the jig connecting step; and a welding step for connecting the floor assembly, the roof arch, and the side inner assemblies by welding after the third holding step, thereby forming an inner frame.

According to the method in accordance with the present invention, the inner frame is formed by welding the floor assembly, the side inner assemblies, and the roof arch while holding these components, which have been positioned by the first jig and the second jig, which are connected. This obviates the conventional need for carrying the jigs in one piece, while holding the each of the assemblies in an assembled state, to a plurality of processing stations or for tack welding or additional welding at each processing station.

In other words, the inner frame can be formed from the floor assembly, the side inner assemblies, and the roof arch at a single processing station. Unlike the prior art, a number of equipment is not required, thus making it possible to provide a space-saving, economical vehicle body assembling method.

In the present invention, the welding step may further comprise a first welding step for carrying out welding at some of all welding positions, a second jig retraction step for clearing the retainment of the roof arch and the side inner assemblies by the second jig and for retracting the second jig to a predetermined position after the first welding step, and a second welding step for carrying out the welding at remaining welding positions after the second jig retraction step.

With this arrangement, in the first welding step, the welding is carried out at some welding positions, at which the existence of the second jig does not interfere with the welding, to preliminarily connect the floor assembly, the roof arch, and the side inner assemblies, and then the second jig is retracted to carry out the welding at the remaining welding positions, at which the existence of the second jig interferes with welding, thereby completely connecting the floor assembly, the roof arch, and the side inner assemblies.

Further, in this case, after the first welding step, a part of the connection between the first jig and the second jig may be cleared before the second welding step. This makes it possible to carry out the welding also at the welding positions, at which the part of the connection interferes with the welding, in the second welding step.

A vehicle body assembling device in accordance with the present invention is a vehicle body assembly device that forms an inner frame of a vehicle body by using a floor assembly, side inner assemblies, and a roof arch, comprising: a welding unit; a first jig that holds the floor assembly in a state in which the floor assembly is positioned at a predetermined holding position; a second jig that holds the roof arch in a state in which the roof arch is positioned at a predetermined holding position; and a connecting unit that mutually positions the floor assembly and the roof arch by interconnecting the first jig holding the floor assembly and the second jig holding the roof arch, wherein the first jig and the second jig have functions for holding the side inner assemblies in a state in which the side inner assemblies are positioned with respect to the floor assembly and the roof arch positioned by the connecting unit, and the welding unit has a function for connecting the floor assembly, the roof arch, and the side inner assemblies, which are held by the first jig and the second jig, by welding so as to form an inner frame.

As with the case of the foregoing vehicle body assembling method, the device in accordance with the present invention is capable of forming an inner frame from a floor assembly, a roof arch, and side inner assemblies at a single processing station, thus making it possible to provide a space-saving, economical vehicle body assembling device.

BRIEF DESCRIPTION OF DRAWINGS

FIG. 3 is a flowchart illustrating a process carried out by the vehicle body assembling device in FIG. 2.

DESCRIPTION OF EMBODIMENTS

Figure 1:
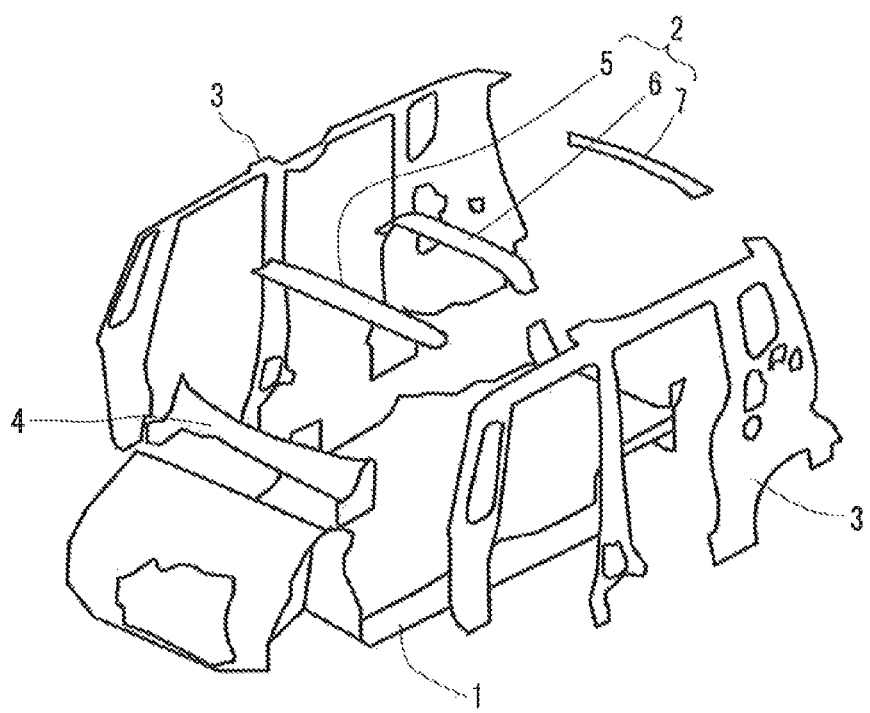
FIG. 1 is a perspective view illustrating each assembly used for forming an inner frame of a vehicle body.

The following will describe an embodiment of the present invention with reference to the accompanying drawings. An inner frame of a vehicle body formed by a vehicle body assembling device according to the embodiment is formed by using a floor complete 1 serving as a floor assembly, a roof arch 2, two side inner completes 3 serving as side inner assemblies, and a windshield 4, as illustrated in FIG. 1. The roof arch 2 is composed of a front roof arch 5, a center roof arch 6, and a rear roof arch 7.

Figure 2A:
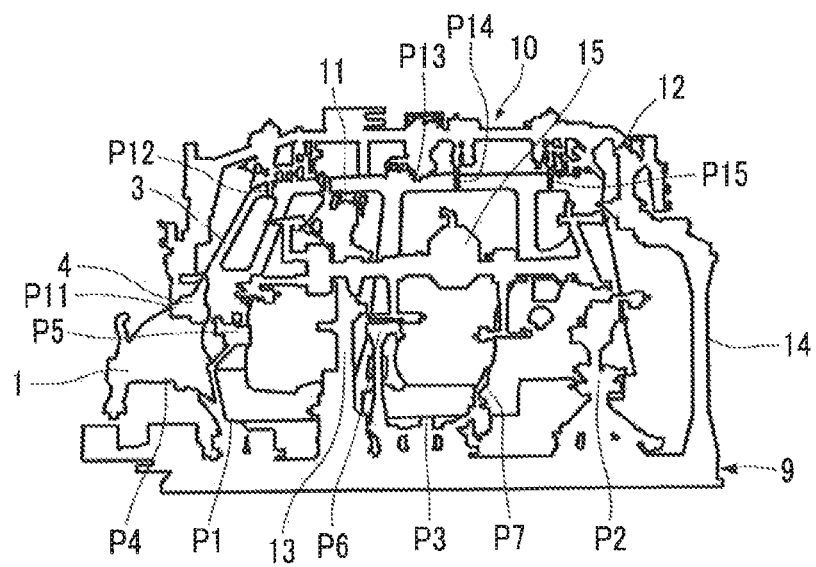
FIG. 2A and FIG. 2B are a front view and a plan view, respectively, of a vehicle body assembling device according to an embodiment of the present invention.
Figure 2B:
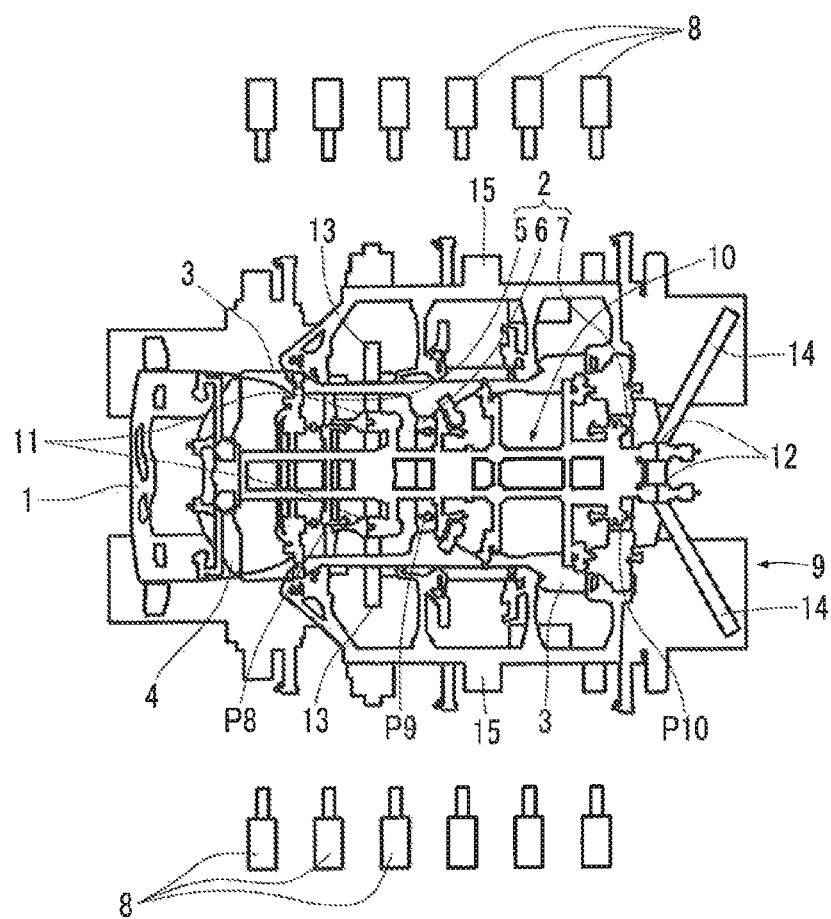

As illustrated in FIG. 2, the vehicle body assembling device according to the embodiment is provided with welding robots 8 serving as welding units, a first jig 9, which holds the floor complete 1 positioned in a state in which the floor complete 1 is positioned at a predetermined holding position, a second jig 10, which holds the roof arch 2 and the windshield 4 in a state in which the roof arch 2 and the windshield 4 are positioned at predetermined holding positions, and front connecting units 11 and rear connecting units 12, which interconnect the first jig 9 and the second jig 10.

The front connecting units 11 and the rear connecting units 12 connect the first jig 9 holding the floor complete 1 and the second jig 10 holding the roof arch 2 and the windshield 4 thereby to mutually position the floor complete 1, the roof arch 2, and the windshield 4. The front connecting units 11 and the rear connecting units 12 are respectively provided two each at positions that are symmetrical in the right and left direction of the vehicle body.

The first jig 9 and the second jig 10 have functions for holding the side inner completes 3 in a state in which the side inner completes 3 are partly in contact with and are positioned relative to the floor complete 1, the roof arch 2, and the windshield 4, which are positioned by the front connecting units 11 and the rear connecting units 12. The welding robots 8 connect, by welding, the floor complete 1, the roof arch 2, the windshield 4, and the side inner completes 3, which are held by the first jig 9 and the second jig 10 as described above, thereby forming the inner frame.

The first jig 9 supports the floor complete 1 at seating positions P1 to P4 illustrated in FIG. 2 thereby to hold the floor complete 1 in a positioned state. At the seating positions P1 and P2, draining pins are inserted for positioning. The seating positions P1 to P4 are individually defined by each pair at positions that are symmetrical in the right and left direction of the vehicle body.

Further, the first jig 9 holds the right and left side inner completes 3 in a positioned state at holding positions P5 to P7 illustrated in FIG. 2. The holding is accomplished by inserting positioning pins in positioning holes provided in the panels of the side inner completes 3 and by clamping the panels by using clamping members from the protruding distal end sides of the pins to the jig side.

The second jig 10 supports the front roof arch 5, the center roof arch 6, and the rear roof arch 7 in a state in which these arches are positioned at holding positions P8 to P10 illustrated in FIG. 2, and holds the windshield 4 in a state in which the windshield 4 is positioned at a holding position P11. The holding positions P8 to P11 are respectively defined by each pair at positions that are symmetrical in the right and left direction of the vehicle body.

The holding at the holding positions P8 to P10 is accomplished by inserting positioning pins into positioning holes provided in corresponding panels of the roof arch 2 and by clamping each of the edges of the roof arch 2 in the front-back direction of the positioning holes. The holding at the holding position P11 is accomplished by using a clamp or the like.

Further, the second jig 10 holds the right and left side inner completes 3 in a state in which each of the completes 3 are positioned at holding positions P12 to P15 illustrated in FIG. 2. The support at the holding position P12 is accomplished by inserting positioning pins in positioning holes provided in the panels of the side inner completes 3 and by clamping a few locations in the vicinity of the positioning holes. Further, the holding at the holding positions P13 to P15 is accomplished by clamping the panels of the side inner completes 3.

Each of the front connecting units 11 is configured of a connecting section in the first jig 9 side, which is provided on a front docking support 13 on the first jig 9, and a connecting section in the second jig 10 side, which is provided at a corresponding position on the second jig 10. Each of the rear connecting units 12 is configured of a connecting section in the first jig 9 side, which is provided on a rear docking support 14 on the first jig 9, and a connecting section in the second jig 10 side, which is provided at a corresponding position on the second jig 10.

FIG. 3 is a flowchart illustrating the process for forming the inner frame carried out by the vehicle body assembling device. When the process for forming the inner frame is started, first, the front docking supports 13 on the first jig 9 are raised and kept raised, as illustrated in FIG. 3 (step S1).

Next, a first holding step for holding, by the first jig 9, the floor complete 1 positioned in a state, in which the floor complete 1 is positioned at a predetermined holding position, is carried out (step S2). More specifically, the floor complete 1 is carried by a shuttle conveyor and transferred to the first jig 9. At this time, the first jig 9 supports the floor complete 1 at the seating positions P1 to P4 as described above. This positions the floor complete 1 with respect to the first jig 9 and the floor complete 1 is held by the first jig 9.

Subsequently, a second holding step is carried out, in which the second jig 10 holds the roof arch 2 and the windshield 4 in a state in which the roof arch 2 and the windshield 4 are in a state positioned at predetermined holding positions (step S3). The holding is carried out in a state in which the roof arch 2 and the windshield 4 are positioned at the holding positions P8 to P10 and P11 as described above.

Subsequently, a jig connecting step is carried out, in which the first jig 9 and the second jig 10 are connected to mutually position the floor complete 1 and the roof arch 2, and the windshield 4 (step S4). The connection is accomplished by the front connecting units 11 and the rear connecting units 12.

Subsequently, a third holding step is carried out, in which the first jig 9 and the second jig 10 hold the side inner completes 3 in a state in which the side inner completes 3 are partly in contact with and are positioned with respect to the floor complete 1, the roof arch 2, and the windshield 4 (step S5).

More specifically, carrying hands 15 (refer to FIG. 2) holding the right and left side inner completes 3, respectively, move down the side inner completes 3 with the bottom ends thereof facing toward the floor complete 1. At this time, the bottom ends of the side inner completes 3 at the positions corresponding to the front docking supports 13 are open, so that the side inner completes 3 do not interfere with the front docking supports 13.

When the side inner completes 3 reach predetermined descent positions, the carrying hands 15 move the side inner completes 3 toward the floor complete 1 and the roof arch 2. Thus, the side inner completes 3 come partly in contact with the floor complete 1, the roof arch 2, and the windshield 4 and are positioned with respect to the first jig 9 and the second jig 10, and held by the first jig 9 and the second jig 10.

More specifically, the first jig 9 holds the right and left side inner completes 3 in a state in which the right and left side inner completes 3 are positioned at the holding positions P5 to P7 illustrated in FIG. 2 as described above. The second jig 10 holds the right and left side inner completes 3 in a state in which the right and left side inner completes 3 are individually positioned at the holding positions P12 to P15 illustrated in FIG. 2. When the holding is completed, each of the carrying hands 15 clear the holding of the side inner completes 3 and retract.

Subsequently, welding steps are carried out to connect the floor complete 1, the roof arch 2, the side inner completes 3, and the windshield 4 by welding so as to form the inner frame (steps S6 to S9). The welding steps include a first welding step (step S6), a second jig retraction step (step S7), a docking support retraction step (step S8), and a second welding step (step S9).

In the first welding step (step S6), the welding is carried out at some of all welding positions. More specifically, a predetermined number of the all predetermined welding spots are spot-welded by the welding robots 8 to connect the floor complete 1, the roof arch 2, the side inner completes 3, and the windshield 4 to preliminarily form the inner frame.

In the second jig retraction step (step S7), the second jig 10 clears the holding of the roof arch 2, the side inner completes 3, and the windshield 4 and retracts to a predetermined position where the second jig 10 does not interfere with the second welding step (step S7).

In the docking support retraction step (step S8), the connection between the first jig 9 and the second jig 10 is partly cleared. More specifically, the connection by the front connecting units 11 is cleared and the right and left front docking supports 13 of the first jig 9 that was in a raised state are individually lowered outward in the right and left direction and placed at retraction positions (step S8).

Then, in the second welding step (step S9), the welding robots 8 spot-weld the remaining welding spots. At this time, the second jig 10 and the front docking supports 13 do not interfere with the welding of the remaining welding spots, since the second jig 10 and the front docking supports 13 have been positioned in the retraction positions. Thus, the floor complete 1, the roof arch 2, the side inner completes 3, and the windshield 4 are completely connected to each other, completing the inner frame.

Outer panels and the like are attached to the completed inner frame afterward. Thus, the vehicle body is formed.

Figure 4:
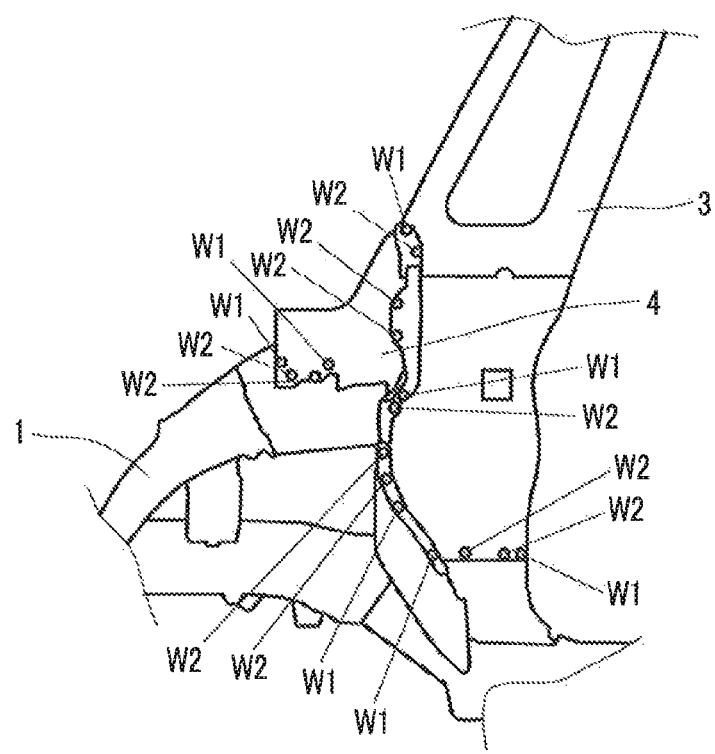
FIG. 4 is a diagram illustrating exemplary welding spots in welding steps in the process in FIG. 3.

FIG. 4 illustrates exemplary welding spots in the welding of the first welding step (step S6) and the second welding step (step S9) described above. As illustrated in FIG. 4, the numbers of welding spots W1 in the first welding step and welding spots W2 in the second welding step are set to be approximately the same so as to maintain the positional relationship among the floor complete 1, the roof arch 2, the side inner completes 3, and the windshield 4 after the second jig retraction step (step S7) and the docking support retraction step (step S8) are carried out, thus preventing the occurrence of difficulties in the welding process of the second welding step (step S9).

According to the present embodiment, the floor complete 1, the roof arch 2, the side inner completes 3, and the windshield 4 are welded while being held in a mutually positioned state by the first jig and the second jig, which are connected, thus forming the inner frame. This arrangement obviates the conventional need for preliminary assembly or additional welding at a plurality of processing stations, making it possible to form the inner frame from the floor complete 1, the roof arch 2, the side inner completes 3, and the windshield 4 at a single processing station. Hence, space saving and reduced cost can be achieved in the manufacture of vehicle bodies.

Further, in the first welding step (step S6), the welding is carried out at some welding positions, at which the presence of the second jig 10 does not interfere with the welding, to preliminarily connect the floor complete 1, the roof arch 2, the side inner completes 3, and the windshield 4. Thereafter, the welding is carried out at the remaining welding positions after the second jig is retracted, thus making it possible to connect the floor complete 1, the roof arch 2, the side inner completes 3, and the windshield 4 without difficulty.

Further, in this case, after the first welding step (step S6), the connection between the first jig 9 and the second jig 10 by the front connecting units 11 is cleared to retract the front docking supports 13 before the second welding step (step S9). Therefore, the welding can be carried out at the welding positions, at which the presence of the front docking supports 13 interferes with welding, without difficulty in the second welding step (step S9).

INDUSTRIAL APPLICABILITY

The present invention is used to form an inner frame of a vehicle body by using a floor assembly, side inner assemblies, and a roof arch. At that time, the inner frame can be formed at a single processing station.

DESCRIPTION OF REFERENCE NUMERALS

1 . . . Floor complete (Floor assembly); 2 . . . Roof arch; 3 . . . Side inner complete (Side inner assembly); 4 . . . Windshield; 9 . . . First jig; 10 . . . Second jig; 11 . . . Front connecting unit; 12 . . . Rear connecting unit

The invention claimed is:

1. A vehicle body assembling method for forming an inner frame of a vehicle body by using a floor assembly, side inner assemblies, and a roof arch, comprising:

a first holding step for holding the floor assembly by a first jig in a state in which the floor assembly is positioned at a predetermined holding position;

a second holding step for holding the roof arch by a second jig which has a different body from the first jig in a state in which the roof arch is positioned at a predetermined holding position;

a jig connecting step for connecting the first jig and the second jig so as to mutually position the floor assembly and the roof arch after the first holding step and the second holding step;

a third holding step for holding the side inner assemblies by the first jig and the second jig in a state, in which the side inner assemblies are partly in contact with and positioned with respect to the floor assembly and the roof arch, after the jig connecting step; and a welding step for connecting the floor assembly, the roof arch, and the side inner assemblies by welding after the third holding step, thereby forming the inner frame, wherein the welding step comprises:

a first welding step for carrying out welding at some of all welding positions;

a second jig retraction step for clearing the holding of the roof arch and the side inner assemblies by the second jig so as to retract the second jig to a predetermined position after the first welding step; and a second welding step for carrying out welding at remaining welding positions after the second jig retraction step.

2. The vehicle body assembling method according to claim 1, wherein, after the first welding step, the connection between the first jig and the second jig is partly cleared before the second welding step.

* * * * *